2,955,114
NOR-PIPERIDYL GLYCOLATE ESTERS

John H. Biel, Milwaukee, Wis., assignor, by mesne assignments, to Lakeside Laboratories, Inc., Milwaukee, Wis., a corporation of Delaware No Drawing. Filed Mar. 12, 1958, Ser. No. 720,827

6 Claims. (Cl. 260—294.3)

This invention relates to piperidine derivatives. More particularly, this invention is concerned with novel nor-piperidyl glycolates, methods of preparing such compounds, and uses for such compounds.

According to one aspect of the invention there are provided novel nor-piperidyl glycolates of the formula

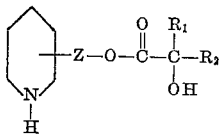

and nontoxic acid addition salts thereof, wherein $R_1$ is a phenyl, cyclohexyl, cyclopentyl, 2-thienyl or 4-pyridyl group, $R_2$ is a phenyl, substituted phenyl group such as chlorophenyl and methoxyphenyl, cyclohexyl, cyclopentyl or alkyl group such as methyl, ethyl, propyl and the like, and Z is a bond or a lower alkylene group of up to five carbons.

These compounds, in the form of nontoxic acid addition salts, produce sedation in animals. The compounds cause a feeling of drowsiness and relaxation in animals. The compounds are not hallucinogenic or psychotogenic nor do they cause central stimulation in mice or rats; these compounds thus have properties diametrically opposed to those of the N-alkyl piperidyl glycolate esters disclosed in my copending application Serial No. 704,247, filed December 23, 1957.

The compounds of this invention may be conveniently produced by condensing an N-arylmethyl hydroxy piperidine or N-arylmethyl hydroxyalkyl piperidine with a lower alkyl ester of the disubstituted glycolic acid to produce an N-arylmethyl piperidyl disubstituted glycolate and then cleaving the N-arylmethyl group by catalytic hydrogenation. This process may be represented as follows:

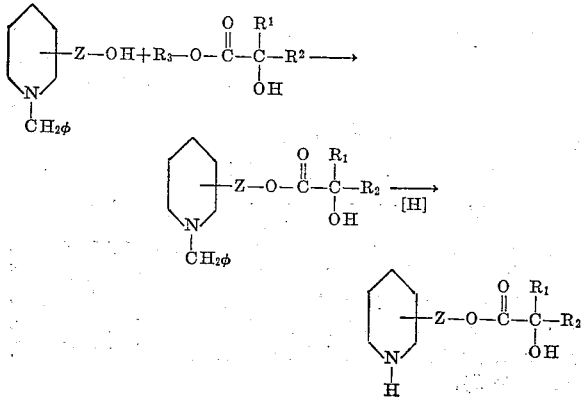

wherein $R_1$, $R_2$ and Z have the significance previously assigned and $R_3$ is a lower alkyl, and $\phi$ is an aryl group such as phenyl, diphenyl or naphthyl.

Representative of the N-arylmethyl piperidyl alcohols which may be used in this process are N-benzyl-3-piperidinol, N-benzyl-4-piperidinol, N-benzyl-2-hydroxymethyl piperidine, N-benzyl-3-$\beta$-hydroxyethyl piperidine, N-benzyl-4-$\alpha$-hydroxypropyl piperidine, N-benzyl-3-[1-(4-hydroxybutyl)]piperidine and similar compounds in which the N-benzyl group is replaced by another N-arylmethyl group such as naphthyl-methyl.

Some of the disubstituted glycolic acids used in the process in the form of lower alkyl esters are methyl benzilate, methyl phenylcyclohexyl glycolate, ethyl phenylcyclopentyl glycolate, methyl 2-thienyl glycolate, ethyl phenyl propyl glycolate, and methyl dicyclohexyl glycolate.

The reaction between the N-arylmethyl piperidyl alcohol and the lower alkyl glycolate ester is conveniently effected by bringing the reactants together in a suitable inert solvent in the presence of sodium or a sodium alkoxide. Solvents such as n-heptane, toluene, xylene or an excess of the N-benzyl piperidyl alcohol may be used. The mixture is generally heated to promote the reaction with the reflux temperature being preferred. As the reaction proceeds, the lower alcohol which is formed in the reaction is distilled off. The reaction is considered completed when low boiling alcohol ceases to distill off. The product is recovered by acidifying the reaction mixture, evaporating to dryness, taking the residue up in water, adding a base such as caustic to the aqueous solution and extracting with an immiscible solvent. The extract may then be dried and the product recovered by distillation.

Some of the intermediate N-arylmethyl esters prepared in this way are N-benzyl-3-piperidyl benzilate, N-benzyl-4-piperidyl benzilate, N-benzyl-2-piperidylmethyl benzilate, N-benzyl-3-piperidyl phenylcyclohexyl glycolate, N-benzyl-4-piperidylpropyl phenylcyclopentyl glycolate, N-benzyl-4-piperidyl phenyl 2-thienyl glycolate, N-benzyl-3-piperidylbutyl benzilate and similar compounds in which the N-benzyl group is a different N-arylmethyl group such as N-diphenylmethyl or N-naphthylmethyl.

These and other N-arylmethyl piperidyl glycolates within the scope of this invention are converted to the corresponding compounds lacking the N-arylmethyl group; i.e., nor-piperidyl glycolates, by catalytic hydrogenation. The catalytic hydrogenation is readily effected by adding the N-arylmethyl piperidyl glycolate, preferably as a salt such as the hydrochloride, to a solvent such as water or a lower alcohol. Low pressure of up to 100 p.s.i. of hydrogen are satisfactory. Palladium is a particularly useful catalyst for the hydrogenation. The hydrogenation proceeds quickly and its progress can be measured by the hydrogen uptake. When the hydrogen uptake ceases the reaction may be considered completed. After filtering the reaction mixture it may be evaporated to dryness and the product triturated with a solvent such as ether and separated by filtration.

Representative of the nor-piperidyl glycolates which are so produced are 3-piperidyl benzilate, 4-piperidyl benzilate, 2-piperidylmethyl benzilate, 3-piperidyl phenylcyclohexyl glycolate, 4-piperidylpropyl phenylcyclopentyl glycolate, 4-piperidyl phenyl 2-thienyl glycolate and 3-piperidylbutyl benzilate.

These compounds may also be produced by reacting an N-arylmethyl halo or alkylhalo piperidine with a di-substituted glycolic acid to form the intermediate N-arylmethyl piperidyl glycolate or N-arylmethyl piperidyl-alkyl glycolate which may then be converted as described above to the corresponding nor-piperidyl glycolate by catalytic hydrogenation with cleavage of the N-arylmethyl group. This process may be represented as follows:

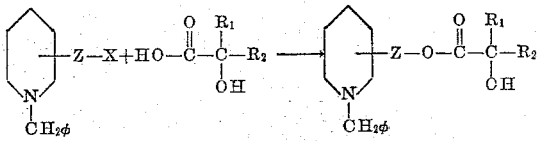

wherein Z, $R_1$, $R_2$ and $\phi$ have the significance previously assigned and X is a reactive halogen such as chlorine, bromine or iodine.

Some of the N-arylmethyl piperidyl halides which may may be used in this process are N-benzyl-3-chloropiperidine, N-benzyl-4-bromopiperidine, N-benzyl-2-chloromethyl piperidine, N-benzyl-2-($\alpha$-bromopropyl)-piperidine, N-diphenyl-3-($\alpha$-bromopropyl)-piperidine and N-naphthyl-4-($\beta$-chloroethyl)-piperidine.

Some of the glycolic acids which may be used are benzilic acid, phenylcyclohexyl glycolic acid, dicyclohexyl glycolic acid, phenylcyclopentyl glycolic acid, phenyl 2-thienyl glycolic acid and dicyclohexyl glycolic acid.

The reaction is conveniently effected by combining the reactants in a suitable inert liquid reaction medium, such as isopropanol, and refluxing the mixture. After filtering and concentrating the reaction mixture in vacuo it is added to water, acidified and the unreacted acid removed with ether. After neutralizing the aqueous layer, the product is extracted with ether and the solution dried. After removing the ether the free base is obtained by vacuum distillation.

N-arylmethyl piperidyl glycolates such as those previously named may be produced by this process.

Acid addition salts of the bases provided by this invention are readily produced by contacting the free base with a suitable acid in the presence of a solvent such as acetone, benzene, ethanol, isopropanol or ether. Typical acids which may be used as hydrochloric acid, sulfuric acid, citric acid, tartaric acid, succinic acid, benzoic acid, phosphoric acid and maleic acid.

The compounds of this invention may be administered to animals and humans as pure compounds. It is advisable, however, to first combine one or more of the compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such or be tableted or be used to fill gelatin capsules. Suitable lubricants like magnesium stearate, binders such as gelatin and disintegrating agents like sodium carbonate in combination with citric acid may be used to form the tablets.

Unit dosage forms such as tablets and capsules may contain any suitable predetermined amount of one or more of the compounds and may be administered one or more at a time at regular intervals. Such forms should, however, generally contain a minimum concentration of 0.1%, and preferably 1.0%, by weight of the compound.

A typical tablet may have the composition:

| | Mg. |
|---|---|
| (1) 3-piperidyl benzilate hydrochloride | 10 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

Tablets may also be made of the following ingredients from the stated quantities:

| | Grams |
|---|---|
| (1) 3-piperidyl benzilate hydrochloride | 2000 |
| (2) Lactose, U.S.P. | 800 |
| (3) Dibasic calcium phosphate, U.S.P. | 1527.2 |
| (4) Starch, U.S.P. | 799.3 |
| (5) Calcium stearate | 56.7 |
| (6) Gelatin solution, 1.5 lb./gal. of $H_2O$ | |

Powders 1, 2 and 4 are granulated using enough gelatin solution to wet the mixture. The granules are then combined with the other ingredients, gelatin solution is added to wet the mixture, and it is tableted. The size of the tablets may be varied at will although tablets of 0.25 to 0.50 gm. are satisfactory for many uses.

Capsules are prepared by filling No. 3 hard gelatin capsules with the following ingredients, thoroughly mixed:

| | Mg. |
|---|---|
| (1) 3-piperidyl-phenylcyclohexyl glycolate hydrochloride | 15 |
| (2) Lactose, U.S.P. | 200 |
| (3) Starch, U.S.P. | 16 |
| (4) Talc, U.S.P. | 8 |

The following examples illustrate the preparation of specific compounds within the scope of this invention.

EXAMPLE 1

*N-benzyl-3-hydroxypiperidine*

To 55 g. (0.25 mole) of N-benzyl-3-hydroxypyridinium chloride in 300 cc. of methanol was added 19.0 g. (0.50 mole) of sodium borohydride in small amounts. The solution was refluxed for 3 hours and the complex decomposed with 75 cc. of concentrated hydrochloric acid. The solution was concentrated to dryness. The residue was dissolved in 50 cc. of water and saturated with solid sodium hydroxide. The alkaline solution was extracted with tetrahydrofuran and the combined extracts dried with potassium carbonate. The product was collected by vacuum distillation; B.P. 103–104° C. (0.1 mm.); yield 36.6 g. (76.6%).

*Analysis.*—Calcd. for $C_{21}H_{17}NO$: N, 7.32. Found: N, 7.42. $N_D^{25}$ 1.5470.

The hydrochloride salt was prepared in acetone with ethereal hydrochloric acid, M.P. 222–223° C.

*Analysis.*—Calcd. for $C_{26}H_{28}ClNO_3$: Cl, 8.11; N, 3.20. Found: Cl, 7.88; N, 3.35.

EXAMPLE 3

*3-piperidyl benzilate hydrochloride*

A mixture of 20.05 g. (0.05 mole) of N-benzyl-3-piperidyl benzilate, 3.0 g. of glacial acetic acid and 3.5 g. of 10% palladium-on-charcoal catalyst in 200 cc. of ethanol was reduced at 60 lbs. p.s.i. of hydrogen. The catalyst was removed by filtration and ethereal hydrochloric acid added to the filtrate to pH 3. The filtrate was concentrated to dryness in vacuo, the residue triturated with anhydrous ether, and the product isolated by filtration, M.P. 178–180° C., yield 16.8 g. (97%).

*Analysis.*—Calcd. for $C_{19}H_{22}ClNO_3$: Cl, 10.20; N, 4.03. Found: Cl, 10.27; N, 4.01.

EXAMPLE 4

*N-benzyl-4-hydroxypiperidinium bromide*

Equimolar quantities of benzyl bromide and 4-hydroxypiperidine were reacted in methanol in the presence of potassium carbonate by allowing the reaction mixture to stir and reflux for 4 hours. The inorganic salts were removed by filtration and the filtrate reacted as such (cf. Example 5).

EXAMPLE 5

N-benzyl-4-hydroxypiperidine

The methanolic solution containing the pyridinium derivative (Example 4) was reacted with sodium borohydride in the manner described in Example 1. The product was isolated by distillation in vacuo, B.P. 110–112° C. (0.15 mm.).

EXAMPLE 6

N-benzyl-4-piperidyl benzilate

N-benzyl-4-hydroxypiperidine and methyl benzilate are reacted as in Example 2 to produce this compound.

EXAMPLE 7

4-piperidyl benzilate

N-benzyl-4-piperidyl benzilate is catalytically hydrogenated as in Example 3 to produce this compound which is immediately converted to the hydrochloride.

EXAMPLE 8

N-benzyl-2-piperidyl methanol 2-pyridyl methanol is catalytically reduced to 2-piperidyl methanol which, upon reaction with benzyl chloride and potassium carbonate in ethyl alcohol, yields the product.

EXAMPLE 9

N-benzyl-2-piperidylmethyl benzilate

N-benzyl-2-piperidyl methanol and methyl benzilate are reacted as in Example 2 to produce this product.

EXAMPLE 10

2-piperidylmethyl benzilate

N-benzyl-2-piperidylmethyl benzilate is reductively cleaved as in Example 3 to produce this compound.

EXAMPLE 11

N-benzyl-2-piperidyl-α-propyl benzilate hydrochloride

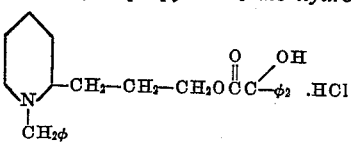

This compound was prepared by mixing equimolar quantities of N-benzyl-2-(α-chloropropyl)-piperidine and benzilic acid in anhydrous isopropyl alcohol and refluxing the mixture for 20 hours. The solvent was removed by distillation and the hydrochloride salt of the above piperidylpropyl ester isolated by filtration.

EXAMPLE 12

2-piperidyl-α-propyl benzilate hydrochloride

The product of Example 11 is catalytically hydrogenated as in Example 3 to produce this compound.

Various changes and modifications of the invention can be made and, to the extent that such variations incorporate the spirit of this invention, they are intended to be included within the scope of the appended claims.

What is claimed is:
1. 3-piperidyl benzilate.
2. 4-piperidyl benzilate.
3. 2-piperidylmethyl benzilate.
4. 2-piperidyl-α-propyl benzilate.
5. A member of the group consisting of compounds of the formulae

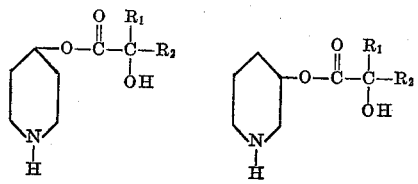

and

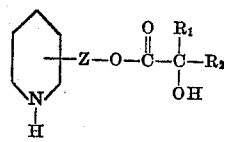

and nontoxic acid addition salts thereof, wherein $R_1$ is a member of the group consisting of phenyl, cyclohexyl, cyclopentyl, 2-thienyl and 4-pyridyl, $R_2$ is a member of the group consisting of phenyl, cyclohexyl, cyclopentyl and lower alkyl groups and Z is a lower alkylene of less than 6 carbons.

6. Compounds of the formula

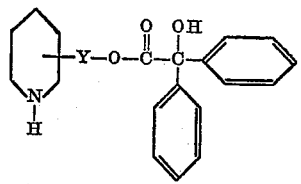

wherein Y is a lower alkylene group.

References Cited in the file of this patent

UNITED STATES PATENTS

| | | |
|---|---|---|
| 2,167,351 | Eisleb | July 25, 1939 |
| 2,486,794 | Miescher | Nov. 1, 1949 |
| 2,680,115 | Rudy et al. | June 1, 1954 |
| 2,792,399 | Ekenstam et al. | May 14, 1957 |
| 2,816,895 | Ehrhart | Dec. 17, 1957 |
| 2,844,591 | Feldkamp et al. | July 22, 1958 |
| 2,846,437 | Elpern | Aug. 5, 1958 |
| 2,850,500 | Elpern | Sept. 2, 1958 |

FOREIGN PATENTS

| | | |
|---|---|---|
| 788,126 | Great Britain | Dec. 23, 1957 |

OTHER REFERENCES

Biel et al.: J.A.C.S., vol. 74, pp. 1485–1488 (1952).
Richter's Organic Chemistry, vol. 13, P. Blackiston's Son and Co. (1923), pp. 3 to 4.
McElvain et al.: J.A.C.S., vol. 70, p. 1828 (1948).

UNITED STATES PATENT OFFICE
CERTIFICATION OF CORRECTION

Patent No. 2,955,114                  October 4, 1960

John H. Biel

It is hereby certified that error appears in the above numbered patent requiring correction and that the said Letters Patent should read as corrected below.

Column 2, line 8, column 3, lines 21 and 22, column 5, lines 40, 48, and 55, and column 6, line 7, for "α" read -- -- , each occurrence; column 2, line 52, for "pressure" read -- pressures --; column 3, line 43, for "as" read -- are --; column 4, line 46, for "$C_{21}$" read -- $C_{12}$ --; same column, after line 46, insert

EXAMPLE 2

N-benzyl-3-piperidyl benzilate

A mixture of 42 g. (0.22 mole) of N-benzyl-3-hydroxy piperidine, 45.6 g. (0.20 mole) of methyl benzilate and 500 cc. of n-heptane was refluxed in the presence of 1.0 g. of sodium methoxide, the methanol being collected in a Dean-Stark water separator. The hot mixture was clarified by filtration and dried over magnesium sulfate. The drying agent was removed by filtration and the filtrate concentrated to dryness. The oily residue crystallized in water and was isolated by filtration, yield 55 g. (68%): M.p. 125-126° C.

Anal. Calcd. for $C_{26}H_{27}NO_3$: N, 3.49.

Found : N, 3.31.

Signed and sealed this 16th day of May 1961.

(SEAL)
Attest:

ERNEST W. SWIDER                      DAVID L. LADD
Attesting Officer                      Commissioner of Patents

UNITED STATES PATENT OFFICE
Certificate of Correction

Patent No. 2,955,114

October 4, 1960

John H. Biel

It is hereby certified that error appears in the above numbered patent requiring correction and that the said Letters Patent should read as corrected below.

Column 2, line 8, column 3, lines 21 and 22, column 5, lines 40, 48 and 55, and column 6, line 7, for "$\alpha$", each occurrence, read —$\gamma$—.

Signed and sealed this 25th day of July 1961.

[SEAL]

Attest:
ERNEST W. SWIDER,
*Attesting Officer.*

DAVID L. LADD,
*Commissioner of Patents.*